Patented Aug. 12, 1947

2,425,615

UNITED STATES PATENT OFFICE 2,425,615

PREPARATION OF TERTIARY ALKOXY ACETONITRILES

William F. Gresham, Wilmington, Del., assignor to E. I. du Pont de Nemours & Company, Wilmington, Del., a corporation of Delaware No Drawing. Application October 3, 1945, Serial No. 620,192

6 Claims. (Cl. 260—464)

1

This invention relates to the preparation of new compositions of matter from tertiary olefines and formaldehyde cyanhydrin and to processes for their preparation.

The over-all process of the invention includes four steps which may be illustrated by way of example by reference to isobutylene and formaldehyde cyanhydrin as the source material. The steps are: (1) t-butoxyacetonitrile is prepared by the reaction of isobutylene with formaldehyde cyanhydrin; (2) the t-butoxyacetonitrile of the first step is hydrogenated and in accord with the type of hydrogenation reaction employed, t-butoxyethylamine or di-t-butoxyethylamine is obtained; (3) an alternate process to that employed for the formation of di-t-butoxyethylamine is provided whereby the t-butoxyethylamine of the hydrogenation step can be converted to di-t-butoxyethylamine; and (4) the hydrolysis of the t-butoxyethylamine or di-t-butoxyethylamine to an olefine and mono or di-ethanolamine.

An object of the invention is to provide new alkoxy substituted nitriles and amines. Another object is to provide processes for the preparation of t-butoxyacetonitrile, the preparation of di-t-butoxyethylamine and the preparation of di-t-butoxyethylamine. Still another object is to provide for the preparation of the above products a process whereby they are formed by the interaction of a tertiary olefine with formaldehyde cyanhydrin for the formation of the intermediate product, a t-alkoxyacetonitrile, and the hydrogenation of that intermediate product for the preparation of an alkoxyethylamine. Yet another object is to provide a process of preparing ethanolamines from mono and di-t-alkoxyethylamine. Other objects and advantages of the invention will hereinafter appear.

In the first step of the process, a tertiary olefine such for example as isobutylene is reacted with formaldehyde cyanhydrin. This reaction is effected by pressuring a closed vessel containing formaldehyde cyanhydrin with isobutylene or mixing liquid isobutylene with formaldehyde cyanhydrin in a suitable reaction vessel and conducting the reaction by heating the resulting mixture in the presence of an inorganic acid catalyst.

This step of the reaction is more specifically conducted by reacting from 1.5 to 20 parts of isobutylene or other tertiary olefine on a mole basis with one part of formaldehyde cyanhydrin. The preferred ratio is 5–15 moles of isobutylene per mole of formaldehyde cyanhydrin. These

2 reactants are brought together at a temperature between 30 and 200° C., preferably at a temperature between around 60 to 100° C. under a pressure ranging between 10 and 100 atmospheres, although higher pressures may be employed if desired. As catalyst for the reaction, any suitable inorganic acid may be employed such, for example, as sulfuric acid, hydrochloric acid, boron fluoride (or its addition products), para-toluene sulfonic acid or any such acid or acid salt which will give a pH in water of less than 6. The catalyst may be used in amounts ranging from 1/8 to 5 molar precent.

This step of the reaction may be illustrated as proceeding in accord with the equation:

(1) $(CH_3)_2C=CH_2 + HOCH_2CN \rightarrow$

$(CH_3)_3COCH_2CN$ which formulates the interaction of isobutylene with formaldehyde cyanhydrin to produce t-butoxyacetonitrile.

The more detailed practice of this step of the invention is illustrated by the following examples in which parts are by weight unless otherwise stated.

*Example 1.*—A mixture of 13.7 parts of formaldehyde cyanhydrin, 0.4 part of concentrated sulfuric acid, and 160 parts of isobutylene was processed in a silver-line pressure resisting shaker tube at 90° for 1.75 hours, and a pressure of 255 p. s. i. Distillation of the reaction product yielded 23 parts of t-butoxyacetonitrile, which boils at 44°/5.5 mm. or 26°/1 mm. Its refractive index, $n_D^{25}$, is 1.4054. In one run under these conditions 85% of the formaldehyde cyanhydrin charged was converted to t-butoxyacetonitrile.

*Example 2.*—The process of Example 1 was repeated using 21.0 parts of formaldehyde cyanhydrin, 1 part of sulfuric acid and 160 parts of isobutylene, the mixture being processed for 2 hours at 80° C. and about 250 p. s. i. An excellent yield of t-butoxyacetonitrile was obtained.

The reaction as described in the above examples may be duplicated by the use of other tertiary olefines such, for example, as 2-methyl butene-1, 2-ethyl butene-1, 2-methyl pentene-1, 2-ethyl pentene-1, 3-methyl butene-2, etc., to provide corresponding tertiary alkoxyacetonitriles In accord with the second step of the process, a t-alkoxyacetonitrile such as t-butoxyacetonitrile, is converted to a corresponding amine by hydrogenation. This may be effected and is preferably effected in the liquid phase employing as catalysts for the reaction a suitable active hydrogenation catalyst such, for example, as those made from nickel, cobalt, fused copper-cobalt, copper chromite, or mixtures thereof or similar catalysts, preferred catalysts for hydrogenation to t-butoxyethylamine being an alkali-free precipitated cobalt oxide catalyst.

The hydrogenation can be conducted in the liquid or vapor phase at temperatures ranging between 25 and 200° C. and at pressures between 1 and 1000 atmospheres although it is preferred to conduct the hydrogenation of the nitrile at temperatures between 75 and 150° C. and under pressures between 20 and 1000 atmospheres.

It has been found that by-product formation is inhibited during hydrogenation, yields are increased, and the reaction made to proceed more smoothly with the production favoring the primary amine as product if there be present during the reaction from 1 to 20 moles of ammonia per mole of the nitrile. If desired, the nitrile to be hydrogenated may be dissolved in aqueous ammonia or the nitrile may be dissolved in suitable solvent such as methanol, di(isobutyl) ether, dioxane, cyclohexane, or 1,3-dioxolane, or other suitable solvent which is not decomposed or hydrogenated during the reaction or decomposed by the ammonia added to the solution.

This, the second step of the process, may be illustrated by the equations:

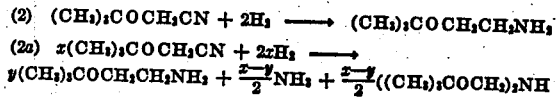

Equation 2 illustrates the hydrogenation of the nitrile to t-butoxyethylamine while Equation 2a, in which $x$ is a positive integer and $y$ is less than $x$, illustrates the conversion of the nitrile to di-t-butoxyethylamine although as shown some mono t-butoxyethylamine may also be present.

Generally normal hydrogenation, either in the presence or the absence of a solvent described aforesaid, will produce both the mono and the diamine. It may be desirable to conduct the reaction in order to favor the formation of the monoamine or the formation of the diamine. If it is desired to favor the formation of the monoamine, this can be accomplished by conducting the hydrogenation in the presence of in the order of preferably 10 to 15 molar proportions of ammonia with hydrogen pressures around 700 atmospheres and temperatures in the neighborhood of 120° C. for discontinuous operation while for continuous operation a lower proportion of ammonia is suggested in the order of 5 molar proportions with a somewhat lower pressure in the order of 300 atmospheres. Moreover, as has been indicated, cobalt catalysts favor the formation of primary amines while nickel catalysts tend to give mixtures.

The second step of the process for the formation of the monoamine may be conducted in accord with this example.

Example 3.—A charge of 64.8 parts of t-butoxyacetonitrile, 130 parts of anhydrous ammonia, and 40 parts of cobalt catalyst was divided and processed in two silver-lined shaker tubes at 120–138° for 1 hour under hydrogen pressure of 600–800 atmospheres. Distillation of the reaction product yielded 63.2 parts (94% conversion) of t-butoxyethylamine, neutral equivalent 118.1, 118.4 vs. 117 theoretical. This product has a boiling point of 64°/64 mm., and its refractive index, $n_D^{25}$, is 1.4128.

To favor the formation of the di-t-alkoxy-ethylamine it is preferable to carry out the hydrogenation in the presence of a suitable solvent. The solvents may be used to the extent of at least 20% by weight and the hydrogenation is preferably conducted at somewhat lower pressures ranging between 20 and 100 atmospheres, the hydrogenation proceeding for about 10–200 minutes in batchwise operation. Longer periods of hydrogenation will tend to favor the formation of the diamine.

These examples illustrate the hydrogenation of the nitrile by a process which favors the formation of the di-t-butoxy-ethylamine.

Example 4.—A mixture of 33.0 parts of t-butoxyacetonitrile, 33.7 parts of cyclohexane, and 5 parts of Raney nickel catalyst was processed under 450 p. s. i. hydrogen pressure in a silver-lined shaker tube at 90–125° for two hours. Distillation gave the following fractions: (1) a 5.6 parts foreshot shown by titration to contain 4.2 parts of t-butoxyethylamine, (2) 15.1 parts of t-butoxyethylamine, neutral equivalent 116.9, 118.2, (3) a 3.6 parts intermediate fraction, neutral equivalent 135.5, 137.7, containing 2.9 parts t-butoxyethylamine and 0.7 part di-(t-butoxyethyl) amine, and (4) 5.3 parts of di-(t-butoxyethyl) amine, neutral equivalent 225.7, 225.7 vs. 217 theoretical. The boiling range of fraction 4 was 79–81°/3 mm. Thus t-butoxyethylamine was obtained in 65% conversion while di-(t-butoxyethyl) amine was obtained in 19% conversion.

Example 5.—When a mixture of 23.8 parts of t-butoxyacetonitrile, 75.9 parts of cyclohexane, and 10 parts of Raney nickel catalyst was processed under 450 p. s. i. hydrogen pressure at 92–108° for 15 minutes, the conversion to t-butoxyethylamine was 69% and the conversion to di-(t-butoxyethyl) amine was 10.5%.

Similarly the tertiary alkoxyethylamines prepared from tertiary olefines other than isobutylene can be hydrogenated by either of the above-described processes for obtaining on the one hand a mixture of the mono and diamine and on the other an excess of the monoamine.

An alternate method for the preparation of the di-t-butoxy ethylamine, referred to herein as the third step, is provided by a process wherein the monoamine of the second step is converted to the diamine, preferably in the presence of hydrogen. It has been found that the second step of the process, while it gives under the indicated conditions both the mono and diamine, the former can be converted to the latter in excellent yields if it be separated from the diamine which can be readily done by distillation and processed in the presence of hydrogen and a suitable hydrogenation catalyst. While the catalyst described for use in the second step may be employed for this purpose, and will convert appreciable quantities of the mono to the diamine, it is preferred to use a supported nickel catalyst such as nickel or kieselguhr. Cobalt and nickel hydrogenation catalysts which contain alkali, incorporated in the catalyst during preparation or during activation, such as the Raney type catalysts, may also be used. The process of this step is preferably conducted at a somewhat higher temperature, say between 150° and 300° with preferred temperatures between 200 and 230° C., under pressures between 10 and 1000 atmospheres and preferably between 20 and 100 atmospheres. Solvents such as those described in step two may be used if desired.

This step of the process is illustrated by the equation:

(3) $2(CH_3)_3COCH_2CH_2NH_2 \rightarrow$
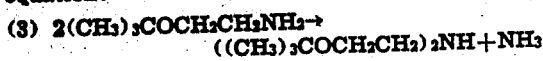
$((CH_3)_3COCH_2CH_2)_2NH + NH_3$ which illustrates the formation of di-t-butoxyethylamine from the mono t-butoxyethylamine.

These examples describe specific embodiments of the third step of the process in which parts are by weight unless otherwise stated:

*Example 6.*—A mixture of 23.8 parts of t-isobutoxyacetonitrile and 75.9 parts of cyclohexane was hydrogenated in the presence of a nickel alloy catalyst (Raney nickel type) under a hydrogen pressure of approximately 450 p. s. i. The reaction was conducted at a temperature between 92 and 108° C. for approximately 30 minutes. The reaction mixture was subjected to fractional distillation and 10.5% of the t-butoxyacetonitrile was converted to the secondary amine.

*Example 7.*—A mixture of 136.8 parts of t-butoxyethylamine and 15 parts of nickel-on-kieselguhr catalyst was processed in a silver-lined shaker tube under 450–770 p. s. i. hydrogen pressure at 198–228° for 75 minutes. Distillation of the reaction product wave di-(t-butoxyethyl)amine, B. P. 94°/1 mm., neutral equivalent 217, 219 vs. 217 theoretical, in 65% conversion (based on the t-butoxyethylamine charged) and 79% yield (based on the t-butoxyethylamine not recovered).

Similarly, the higher molecular weight mono t-alkoxyethylamine prepared by the hydrogenation of the t-alkoxyacetonitrile prepared from isoolefines higher than isobutylene can be treated in accord with Examples 6 and 7 to convert the mono amine to the diamine.

The mono and di-t-alkoxyethylamines of the above or other processes are hydrolyzed by the fourth step to a mono or diethanolamine. The hydrolysis step is illustrated by Equations 4 and 5.

(4) $(CH_3)_3COCH_2CH_2NH_2 \rightarrow$
$HOCH_2CH_2NH_2 + (CH_3)_2C=CH_2$ (5) $((CH_3)_3COCH_2CH_2)_2NH \rightarrow$
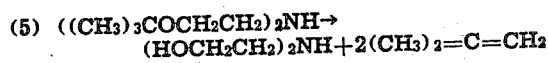
$(HOCH_2CH_2)_2NH + 2(CH_3)_2C=CH_2$ Equation 4 formulates the hydrolysis of monomeric t-butoxyethylamine to ethanolamine and Equation 5 the hydrolysis of di-t-butoxyethylamine to diethanolamine.

The hydrolysis step is conducted by cooling an aqueous solution of the mono or diamine, slowly adding a hydrolysis catalyst such as sulfuric acid, and refluxing under normal pressure while taking off the volatile hydrolysis products leaving in the reaction vessel the mono or diethanolamine. Any suitable hydrolysis catalyst may be employed such, for example, as sulfuric acid, phosphoric acid, paratoluenesulfonic acid and the like or mixtures thereof and these catalysts should be employed in sufficient amounts and concentrations to effect the hydrolysis at reflux temperatures within at least 6 or 8 hours. If desired, the hydrolysis may be effected under pressure and the corresponding temperatures above the normal boiling point of the aqueous mixture or, contrarywise, under reduced pressures with temperatures below the boiling point of the mixture. In the latter case, a longer period of time generally is required to effect the hydrolysis.

The Examples 8 and 9 illustrate the fourth step of the process wherein the parts are by weight unless otherwise indicated.

*Example 8.*—A reaction vessel fitted with a reflux condenser was charged with 25.6 parts of mono t-butoxyethylamine and 59.4 parts of water. The resulting mixture was cooled to about 5° C. and 21.8 parts of 100% sulfuric acid gradually added with stirring, the temperature not being permitted to rise appreciably above 30° C. during the addition. The temperature of the mixture was then raised to its boiling point, which ranged from 78 to 98° C. and refluxed in this range until no more volatile products distilled over. The product was cooled, 17.5 parts of caustic soda added to neutralize the acid and the water then removed at approximately 40 mm. pressure and thereafter the ethanolamine distilled from the dehydrated mixture at a pressure of approximately 1 mm. An 8.93% conversion of the isobutoxyethylamine to ethanolamine was obtained.

*Example 9.*—A reaction vessel similar to that described in Example 8 was charged with 16.3 parts of di-t-butoxyethylamine and 18.2 parts of water. The amine-water mixture was cooled and to the cooled solution 7.7 parts of 100% sulfuric acid was gradually added at such a rate that the temperature of the solution was maintained below approximately 30° C. The mixture was heated to reflux temperature and refluxed for about 6 hours to drive off the isobutylene and other products formed during the hydrolysis which were volatile at refluxing temperature. The reaction mixture was then treated in accord with the process described in Example 7 and approximately a 77% conversion of the di-t-butoxyethylamine to diethanolamine was obtained.

The products of the reaction have many uses. All are valuable intermediates for making many organic compounds. The mono and di-t-butoxyethylamines may be used directly as thickeners, non-polar detergents, softeners and plasticizers for regenerated cellulose, cellulose ethers, esters, and the like while the ethanolamines have many well known uses in the arts.

I claim:

1. A process for the preparation of a tertiary alkoxyacetonitrile which comprises heating under pressure a tertiary olefine with formaldehyde cyanhydrin in the presence of an acid catalyst.

2. A process for the preparation of t-butoxyacetonitrile which comprises heating under pressure isobutylene with formaldehyde cyanhydrin in the presence of an acid catalyst at a temperature between 30 and 200° C.

3. A process for the preparation of t-butoxyacetonitrile which comprises heating a reaction mixture containing from 1.5 to 20 parts of isobutylene per part of formaldehyde cyanhydrin on a molar basis at a temperature between 30 and 200° C. and under a pressure between 10 and 100 atmospheres.

4. A process for the preparation of t-butoxyacetonitrile which comprises subjecting a mixture of about 21 parts of formaldehyde cyanhydrin, 1 part of sulfuric acid and 160 parts of isobutylene to temperature of approximately 80° C. under a pressure of about 250 pounds per square inch, for two hours and thereafter recovering the t-butoxyacetonitrile from the reaction mixture by distillation.

5. A process for the preparation of a tertiary alkoxyacetonitrile which comprises heating a tertiary olefin with formaldehyde cyanhydrin in the presence of an acid catalyst at a temperature between 30 and 200° C. and under a pressure in excess of 10 atmospheres.

6. A process for the preparation of t-butoxyacetonitrile which comprises heating isobutylene with formaldehyde cyanhydrin in the presence of sulphuric acid as the catalyst at a temperature between 60 and 100° C. and under pressure in excess of 10 atmospheres.

WILLIAM F. GRESHAM.

REFERENCES CITED

The following references are of record in the file of this patent:

FOREIGN PATENTS

| Number | Country | Date |
|---|---|---|
| 393,753 | Great Britain | June 15, 1933 |
| 544,421 | Great Britain | Apr. 13, 1942 |
| 116,260 | Australia | Dec. 24, 1942 |

OTHER REFERENCES

Sommelet, Bull. Soc. Chim. (4), vol. 1, pp. 370–376 (1906).